United States Patent [19]
Haley

[11] 3,738,631
[45] June 12, 1973

[54] SPRING HANGER BRACKET AND LEAF SPRING INTERMEDIATE SUPPORT

[76] Inventor: Richard L. Haley, 2523 North Jefferson Ext., New Castle, Pa. 16105

[22] Filed: June 24, 1971

[21] Appl. No.: 156,231

Related U.S. Application Data
[62] Division of Ser. No. 833,325, June 16, 1969, Pat. No. 3,591,197.

[52] U.S. Cl. .............................. 267/52, 280/104.5 B
[51] Int. Cl. .................................................. B60g 11/10
[58] Field of Search ................. 267/52; 280/104.5 B

[56] References Cited
UNITED STATES PATENTS

| | | | |
|---|---|---|---|
| 3,151,854 | 10/1964 | Felburn | 267/52 |
| 3,386,724 | 6/1968 | Tantlinger | 267/52 |
| 3,469,860 | 9/1969 | Hutchens | 267/52 |
| 2,785,815 | 3/1952 | Cook | 214/396 |
| 3,221,911 | 12/1965 | Modloff et al. | 214/84 |
| 3,219,211 | 11/1965 | Malcom | 214/84 |

FOREIGN PATENTS OR APPLICATIONS

| | | | |
|---|---|---|---|
| 234,956 | 2/1960 | Australia | 280/104.5 B |

*Primary Examiner*—Philip Goodman
*Attorney*—Clarence A. O'Brien and Harvey B. Jacobson

[57] ABSTRACT

A suspension assembly for tandem axles including an equalizer beam pivot axis defining assembly including (1) a rubber bushed pivot shaft of noncircular configuration and designed to be maintained under compression, rather than being placed under shear stresses, by vertical loading as well as during oscillation of the beam, (2) spring hanger and mounting brackets designed for ease in installation on vehicle frames and axles with maximum strength, (3) substantially stationarily spaced spring bearing surfaces and (4) improved spring-to-axle mounting serving to reduce the length of the static mounted spring mid-portions.

9 Claims, 23 Drawing Figures

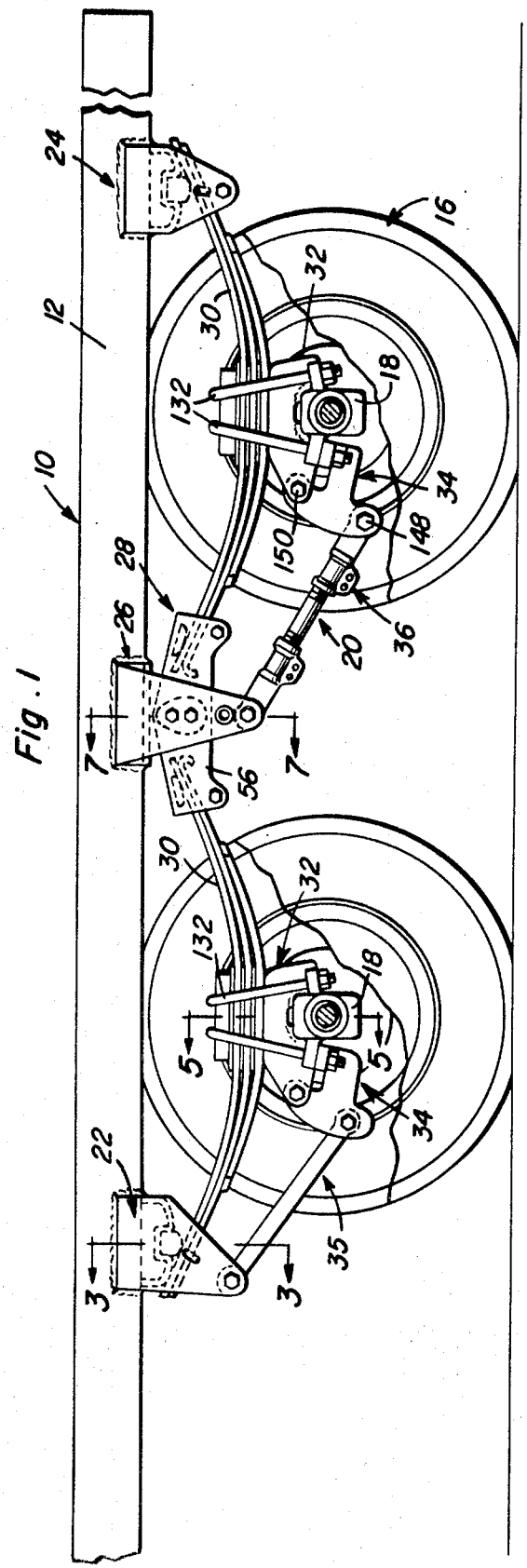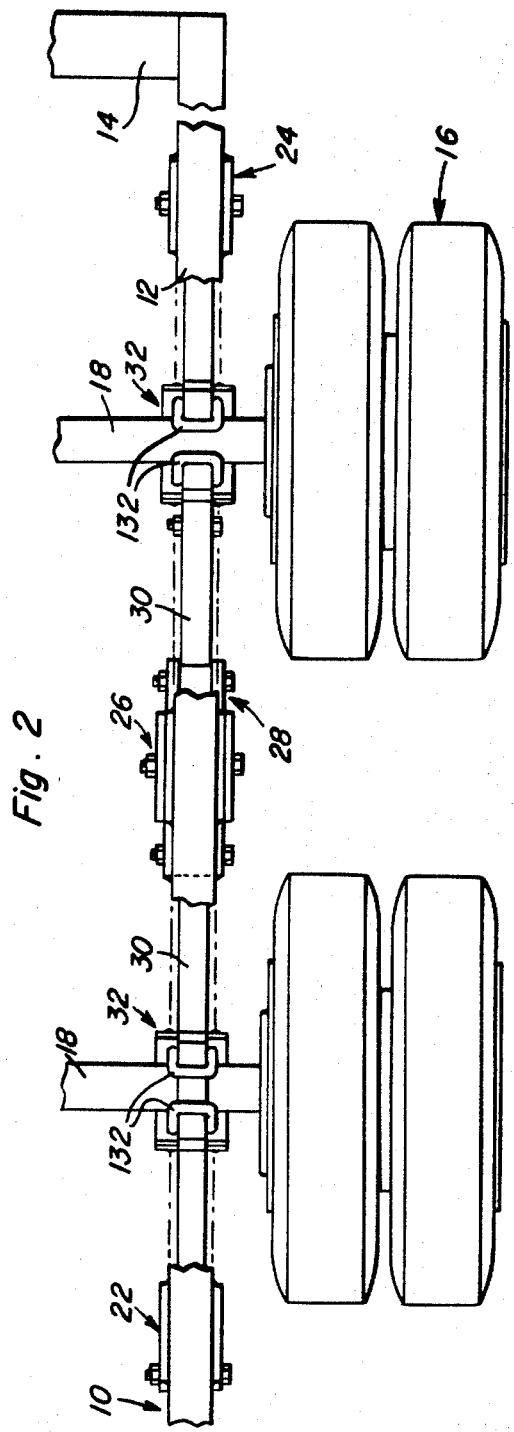
Fig. 1
Fig. 2
Richard L. Haley
INVENTOR.

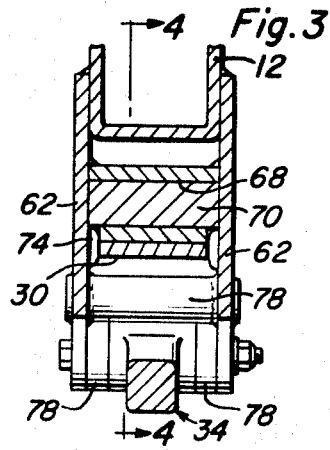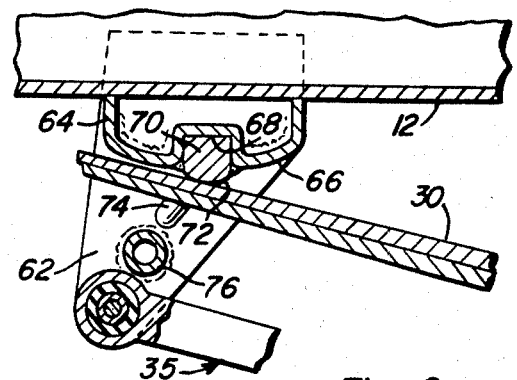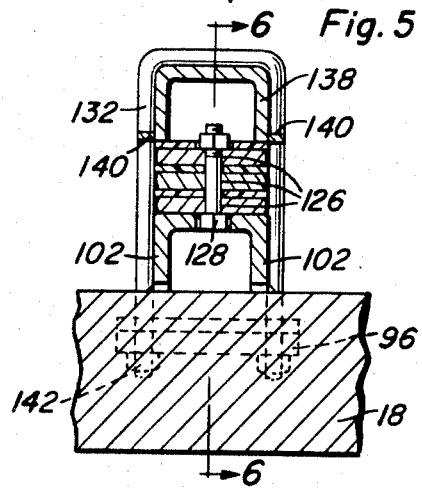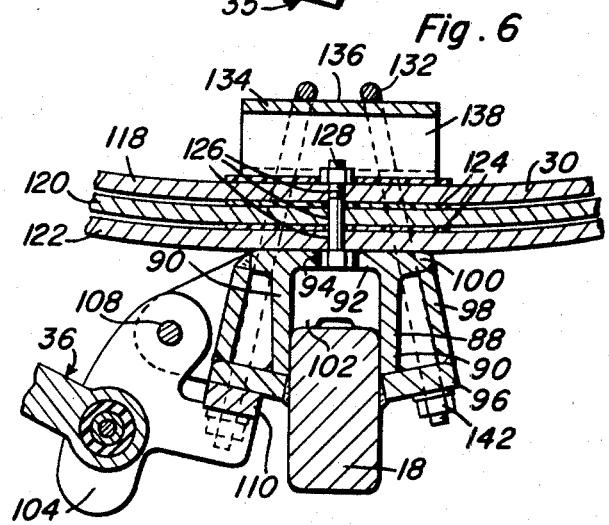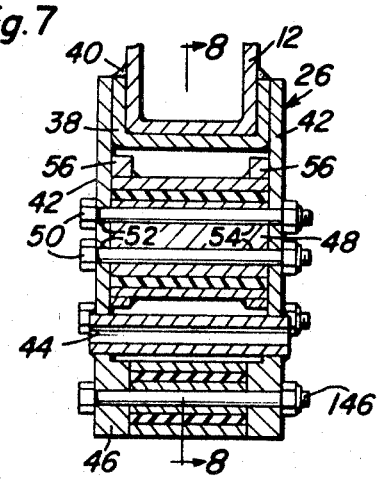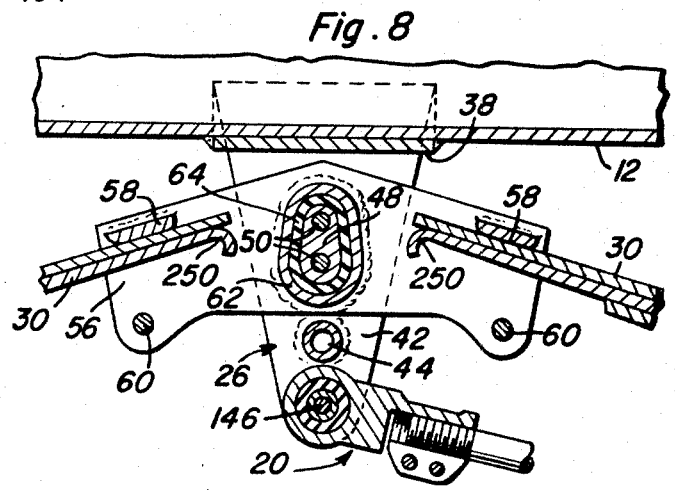

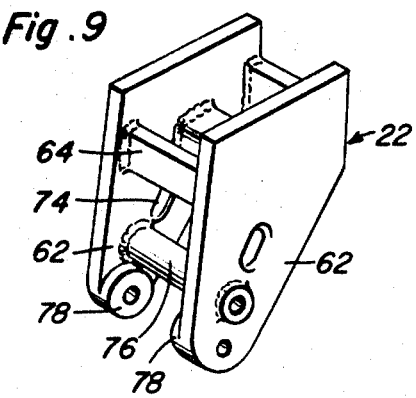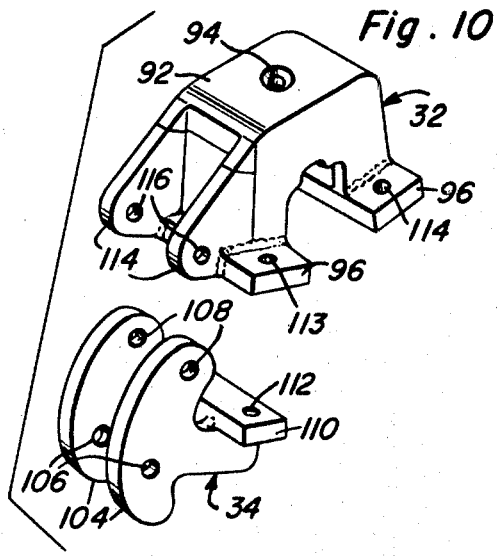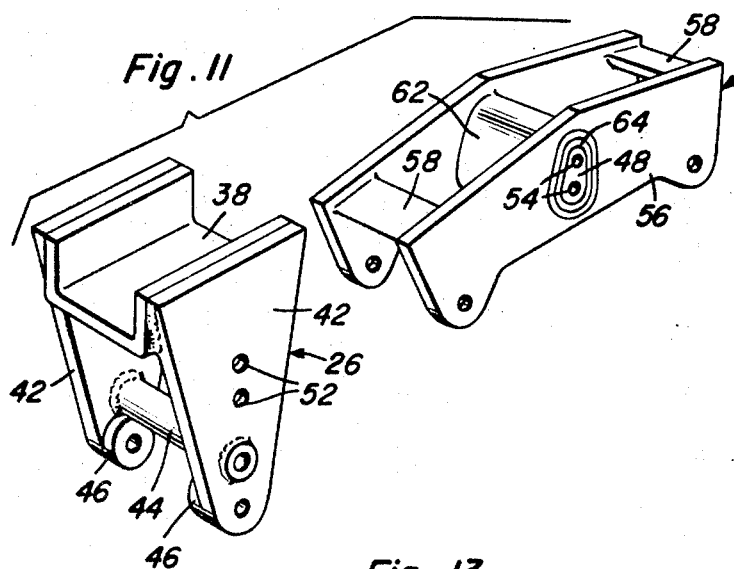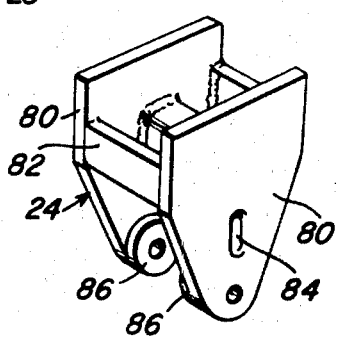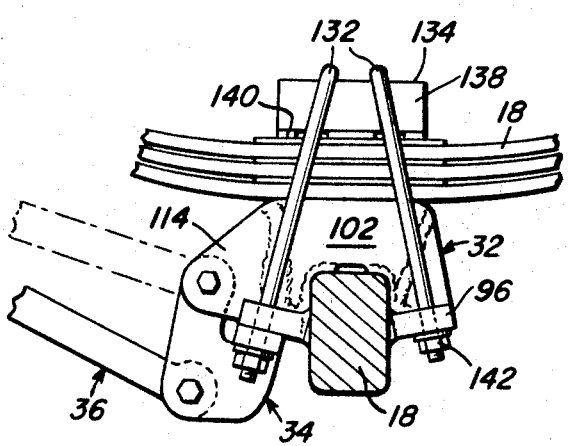
Richard L. Haley
INVENTOR.

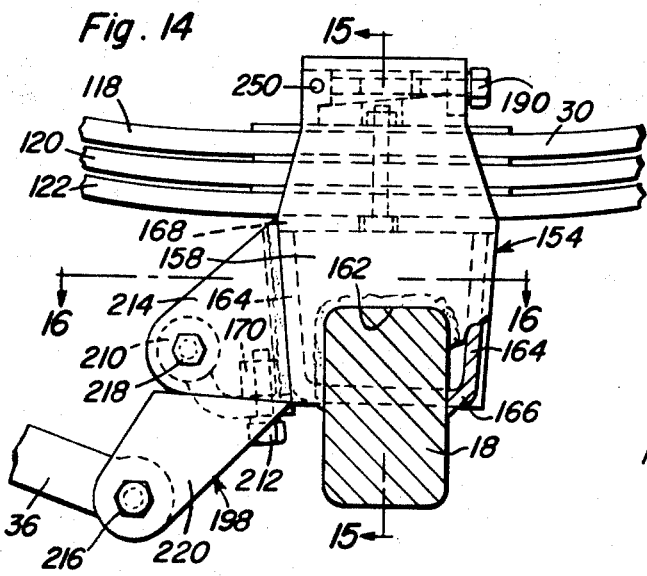
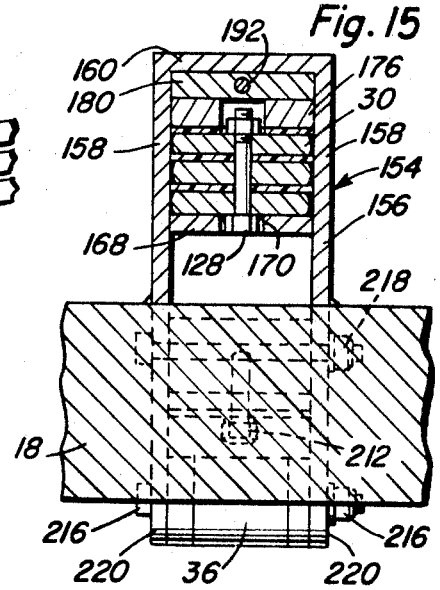
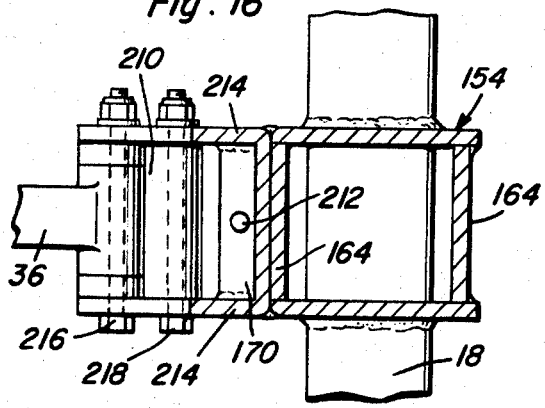
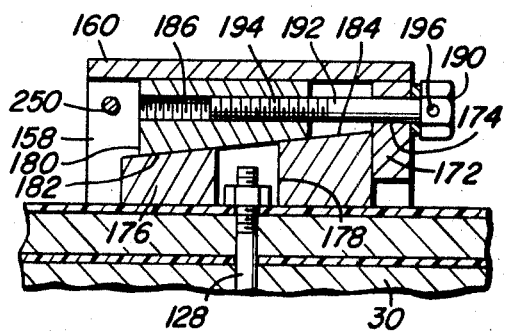
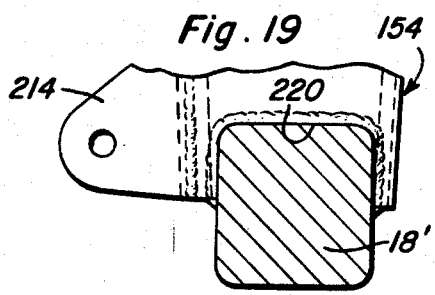
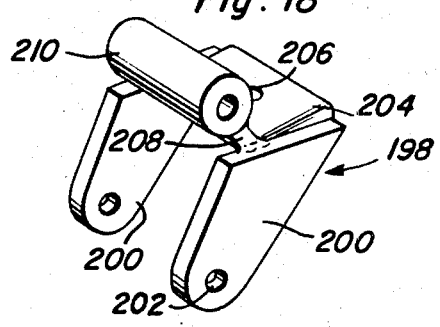
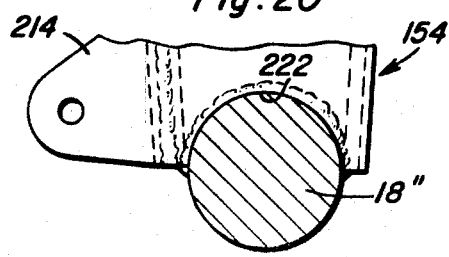
Richard L. Haley
INVENTOR.

Richard L. Haley
INVENTOR.

SPRING HANGER BRACKET AND LEAF SPRING INTERMEDIATE SUPPORT

This application comprises a division of my copending U.S. application Ser. No. 833,325, filed June 16, 1969, now U.S. Pat. No. 3,591,197, dated July 6, 1971.

The axle suspension assembly of the instant invention has been designed to provide a means whereby an efficient tandem axle assembly may be readily fabricated and mounted beneath a vehicle frame. The suspension assembly utilizes fixed bearing pads of cast steel or other materials in the front and rear hanger brackets to maintain relatively constant spring load centers under both loaded and unloaded conditions and the ride characteristics of the suspension assembly are improved by increasing the available live spring length in both the loaded and unloaded condition. Further, the suspension assembly includes symmetrical cam-type bearing pads in the front and rear hanger brackets that are specifically positioned to gain effective spring length under load conditions.

In addition to the basic components of the suspension assembly, the suspension assembly utilizes torque arms to position and align the axles whereby the springs of the assembly are not required to be specifically designed for push-and-pull purposes which inherently has an adverse affect on the riding qualities of a tandem axle suspension assembly.

The brackets of the suspension assembly may be cast or prefabricated and are of simple design and the suspension assembly may be readily provided with anti-hop structure with but a slight addition to the existing basic suspension assembly. Still further, the suspension assembly utilizes a rubber bushed equalizer beam which is basically loaded in compression, both to carry the load and to control articulation thereof. Further, the equalizer beam rubber bushing is constructed and related relative to the beam and its supporting bracket so as to be free of shear forces and to be subject only to compression in both carrying the load and controlling articulation of the equalizer beam.

The main object of this invention is to provide an improved suspension assembly capable of withstanding heavy loads and hard usage with a minimum of wear and maintenance.

Another important object of this invention is to provide the simplification, versatility and reliability of preassembled components to reduce the confusion and expense related to producing, ordering, stocking and installing the subject assembly.

Another object of this invention is to provide a suspension assembly for tandem axles that will be capable of maintaining the associated axles properly aligned, rendering an improved smoother ride and also capable of supporting heavy loads during hard usage.

A still further object of this invention is to provide an axle suspension assembly whose equalizer bracket, equalizer beam and front and rear hanger brackets may be readily constructed either by casting or fabrication methods at a reduction in price over existing corresponding components.

A further important object of this invention is to provide a suspension assembly in accordance with the preceding objects and constructed in a manner whereby the front and rear spring bearing pads thereof are operable to maintain relatively constant spring load centers under both loaded and unloaded conditions. Also, a further important object of this invention is to provide torque arm components capable of maintaining the axles properly aligned independently of the associated springs and thereby enabling the springs to be designed fully for ride and rate requirements without having to have incorporated therein design characteristics adapting the springs for push-and-pull purposes.

Another very important object of this invention is to provide a rubber bushed equalizer beam which will be capable of withstanding heavy loads and full articulation without subjecting its rubber bushing to shear forces.

Yet another object of this invention is to provide an axle suspension assembly including spring seats which may be readily attached to existing axles by welding in a manner so as to provide maximum length welds between the spring seats and the associated axles.

It is a further object of this invention to provide a suspension assembly in accordance with the preceding objects to provide a suspension assembly including novel means for removably securing the center portions of the associated leaf springs to the spring seats in order to provide maximum live spring lengths and to maintain the nuts of the U-bolts utilized to clamp the spring midportions to the spring seats readily available for service torquing. Another object of this invention is to provide a suspension assembly including spring-to-spring seat mounting means in accordance with the immediately preceding object and which will not place undue stresses on the associated axles.

Another important object of this invention is to provide a suspension assembly constructed in a manner whereby movement occurs between both end portions of each leaf spring and the associated spring pads during flexure of the springs so as to divide the wear equally at both ends of each spring and the corresponding wear pads.

A final object of this invention to be specifically enumerated herein is to provide a suspension assembly in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary side elevational view of a vehicle equipped with the suspension assembly of the instant invention and with portions of the suspension assembly being broken away and illustrated in vertical section;

FIG. 2 is a fragmentary top plan view illustrating the foreground portion of the structure shown in FIG. 1;

FIG. 3 is an enlarged fragmentary transverse vertical sectional view taken substantially upon the plane indicated by the section line 3—3 of FIG. 1;

FIG. 4 is a fragmentary longitudinal vertical sectional view taken substantially upon the plane indicated by the section line 4—4 of FIG. 3;

FIG. 5 is an enlarged fragmentary transverse vertical sectional view taken substantially upon the plane indicated by the section line 5—5 of FIG. 1;

FIG. 6 is a fragmentary longitudinal vertical sectional view taken substantially upon the plane indicated by the section line 6—6 of FIG. 5;

FIG. 7 is an enlarged fragmentary transverse vertical sectional view taken substantially upon the plane indicated by the section line 7—7 of FIG. 1;

FIG. 8 is a fragmentary longitudinal vertical sectional view taken substantially upon the plane indicated by the section line 8—8 of FIG. 7;

FIG. 9 is a perspective view of one of the front hanger brackets;

FIG. 10 is an exploded perspective view of one of the spring seats and an associated anti-hop attachment;

FIG. 11 is an exploded perspective view of the equalizer bracket and the equalizer beam;

FIG. 12 is a perspective view of one of the rear hanger brackets;

FIG. 13 is a side elevational view of the assemblage illustrated in FIG. 6 on somewhat of a reduced scale and with the alternate position of the associated torque arm illustrated in phantom lines should it not be desired to use the anti-hop attachment;

FIG. 14 is a view similar to FIG. 6 but illustrating a modified form of spring seat having a modified form of anti-hop attachment secured thereto;

FIG. 15 is a fragmentary transverse vertical sectional view taken substantially upon the plane indicated by the section line 15—15 of FIG. 14;

FIG. 16 is a fragmentary horizontal sectional view taken substantially upon the plane indicated by the section line 16—16 of FIG. 14;

FIG. 17 is a fragmentary enlarged longitudinal vertical sectional view taken substantially upon a plane passing through the center of the upper portion of the modified spring seat illustrated in FIG. 14;

FIG. 18 is a perspective view of the modified form of anti-hop attachment utilized in the embodiment illustrated in FIG. 14;

FIGS. 19 and 20 are fragmentary longitudinal vertical sectional views illustrating the manner in which the spring seat illustrated in FIG. 14 may be modified so as to be adapted for securement to vehicle axles of square and round cross-sectional shapes;

Figure 21:
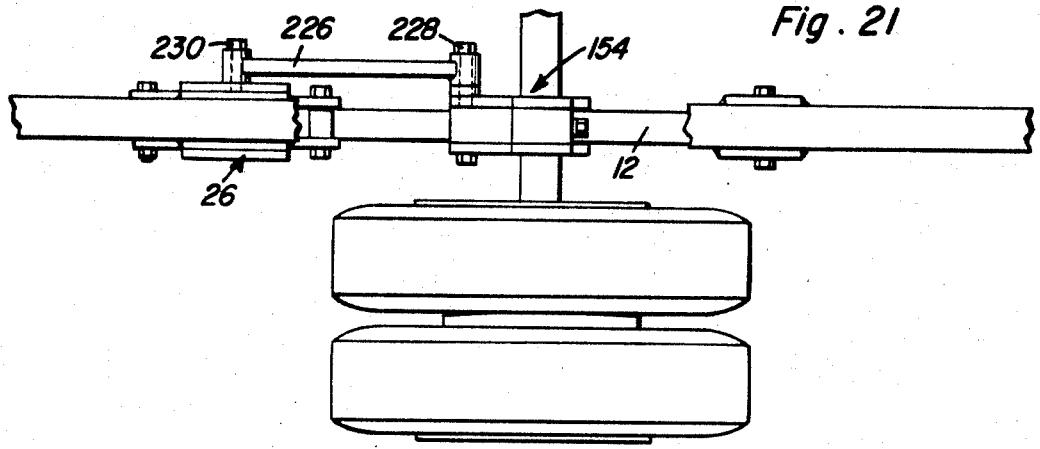
FIG. 21 is a fragmentary top plan view of an axle suspension assembly constructed in accordance with the present invention and illustrating an additional control rod incorporated therein.

Referring now more specifically to the drawings, the numeral 10 generally designates a vehicle frame including a pair of opposite side longitudinal rectangular frame members 12 interconnected at their rear ends by means of a transverse frame member 14 extending therebetween.

The tandem axle assembly of the instant invention is generally referred to by the reference numeral 16 and includes a pair of axle members 18 and the suspension assembly of the instant invention which is referred to in general by the reference numeral 20. The components of the suspension assembly 20 are duplicated on opposite sides of the vehicle frame 10 and are substantially identical except for being positioned on a given side of the frame 10 and secured to the corresponding ends of the axle members 18. Accordingly, only one side of the suspension assembly 20 will be specifically referred to hereinafter.

The suspension assembly 20 includes front and rear hanger brackets 22 and 24, an equalizer beam mounting bracket referred to in general by the reference numeral 26, an equalizer beam referred to in general by the reference numeral 28, identical front and rear springs 30, identical front and rear spring seats referred to in general by the reference numerals 32, anti-hop attachments referred to in general by the reference numerals 34 and front and rear torque arms generally referred to by the reference numerals 35 and 36.

With attention now invited more specifically to FIGS. 7 and 8 of the drawings, it may be seen that the equalizer bracket member 26 includes a U-shaped channel member 38 which snugly embraces the lower portion of the longitudinal frame member 12 and is secured thereto in any convenient manner such as by welding 40, bolting, etc. A pair of vertically elongated triangular plates 42 are secured to the outer surfaces of the opposite sides of the channel member 38 at their upper ends and project downwardly from the channel member 38. The lower end portions of the plates 42 are interconnected by means of a rigid sleeve 44 extending and secured therebetween and the lower terminal ends of the plates 42 include transversely thickened portions 46 which may be defined by washers secured to the inner surface portions of the lower terminal ends of the plates 42.

An elongated rigid member 48 which is generally egg-shaped in cross-sectional shape is secured between the plates 42 by means of elongated fasteners 50 secured through corresponding bores 52 formed in the plates 42 and corresponding bores 54 formed through the elongated member 48.

The equalizer beam 28 includes a pair of generally parallel plates 56 interconnected at upper opposite end corners by means of transversely extending bearing pads 58 secured therebetween and the lower opposite end corners of the plates 56 are interconnected by means of fasteners 60 removably secured therebetween. Further, corresponding mid-portions of the plates 56 have a rigid sleeve 62 secured therebetween and opening, at its opposite ends, through the plates 56. The sleeve 62 is generally egg-shaped in cross-sectional shape and the elongated member 48 is loosely received within the sleeve. However, a sleeve 64 of resilient material such as rubber or Neoprene is snugly telescoped over the elongated member 48 and within the sleeve 62. In this manner, the equalizer beam 28 is rubber bushed and any tendency of the beam 28 to oscillate is controlled by compression of the resilient sleeve 64.

With attention now invited more specifically to FIG. 9 of the drawings, it may be seen that the front equalizer bracket 22 includes a pair of opposite side plates 62 which are substantially identical except for being right and left handed. The plates 62 are vertically disposed and interconnected by means of an upwardly opening channel member 64, see FIG. 4, secured between their upper ends by welding. The channel member 64 includes a bight portion 66 which defines a longitudinally extending downwardly opening groove 68 and a bearing pad support 70 which is in the form of an elongated bar fastened within the groove 68. The bearing pad support includes a radiused undersurface 72 and the plates 62 are inwardly embossed as at 74 to control lateral spring movement. Further, a rigid tube 76 is secured between the lower ends of the plates 62 and the lower terminal ends of the plates 62 are transversely thickened as at 78. The thickening of the plates 62 as at 78 may also be accomplished by the securement of washers to the inner surfaces of the plates 62.

With attention now invited more specifically to FIG. 12 of the drawings it may be seen that each of the rear hanger brackets 24 includes a pair of substantially identical plates 80 rigidly interconnected at their upper ends by means of a channel member 82 similar to channel member 64. In addition, the rear hanger brackets 24 include bearing pad supports which correspond directly to the bearing pad support 70 and the plates 80 are also inwardly embossed as at 84 and are transversely thickened at their lower ends by the securement of washers 86 to their inner surfaces. The washers 78 and 86 are utilized when the hanger brackets 22 and 24 are fabricated, but may be formed integrally with the hanger brackets if the latter are cast.

With attention now invited more specifically to FIGS. 6 and 10 of the drawings it may be seen that each of the spring seats 32 includes an inverted generally U-shaped channel member 88 defining a pair of upstanding legs 90 interconnected at their upper ends by means of a bight portion 92. The bight portion 92 is centrally apertured as at 94 and a pair of thick straps 96 are welded to the lower ends of the legs 90 and project outwardly therefrom. The straps 96 are slightly upwardly divergent and a pair of bracing plates 98 are secured between the outer marginal edge portions of the straps 96 and outwardly projecting extensions 100 of the bight portion 92. Further, each of the spring seats include partial opposite end walls 102 which are contoured to snugly embracingly receive the upper portions of the associated axle member 18.

When the spring seats 32 are secured to the axle members 18, the inner peripheral edge portions of the partial end walls 102 are welded to the axle members 18 and the adjacent inner lower corners of the straps 96 are welded to the axle members 18 throughout their longitudinal extent.

Each of the anti-hop attachments 34 includes a pair of identical plates 104 which are provided with pairs of aligned apertures 106 and 108 and the plates 104 are interconnected by means of an elongated strap 110 secured between the plates 104.

The opposite ends of each strap 110 is apertured as at 112 and the opposite ends of the straps 96 are apertured as at 114. Further, each of the spring seats 32 includes a pair of forwardly projecting mounting and gusset plates 114 which are suitably apertured as at 116. The apertures 112 are registrable with the apertures 114 formed through the corresponding forward straps 96 and the apertures 108 are registrable with the corresponding apertures 116.

Each of the springs 30 includes three leaf springs 118, 120 and 122 stacked relative to each other with the spring leaf 118 disposed uppermost and the spring leaf 122 disposed lowermost. The central portions of the springs 118, 120 and 122 may be spaced apart by means of anti-friction panel members 124 and the spring leaves 118, 120 and 122 are provided with registered apertures 126 an secured together by means of a fastener 128 secured through the apertures 126.

With attention now invited more specifically to FIGS. 5 and 6 of the drawings, it may be seen that each of the spring seats 32 is utilized to secure the corresponding spring 30 to one of the axle members 18 by means of a pair of U-bolts 132 whose threaded ends are secured through the apertures 116 (and the apertures 112 when the anti-hop attachments 34 are utilized). The U-bolts 132 embracingly receive the corresponding spring seats 32 therebetween and have their upper bight portions bearing down upon the upper surface 134 of the bight portion 136 of an inverted channel-shaped member 138 including oppositely directed outturned flanges 140 which are notched to receive the legs of the U-bolts 132. From FIG. 6 of the drawings it may be seen that the U-bolts 132 are upwardly convergent and that the bolts 142 utilized to secure the free ends of the legs of the U-bolts 132 through the apertures 112 are readily accessible from below for tightening. Further, it may be seen that the head of the inverted fastener 128 is received within the aperture 94 so as to maintain the spring 30 properly located relative to the spring seat 32.

The rear torque arm includes a rubber bushed forward end portion which is secured between the lower terminal ends of the plates 42 of the equalizer bracket by means of a fastener 146. The forward end of the torque arm 36 is received between the washers 46 and the torque arm 36 is adjustable in effective length and has its rear lower end secured between the lower ends of the plates 104 by means of a fastener 148 secured through the lower end of the torque arm 36 and the apertures 106. Although the straps 110 of the anti-hop attachments 34 are secured to the forward straps 96 of the corresponding spring seats 32 by means of the corresponding forward U-bolts 132, the upper ends of the plates 104 of each anti-hop attachment 34 are secured to the mounting and bracing flanges 114 by means of a fastener 150, see FIG. 1, secured through the apertures 108 and 116. However, when the anti-hop attachments 34 are not used, the lower ends of the torque arms 36 are secured between the flanges 114 by the fastener 150.

With reference now more specifically to FIGS. 14–17 of the drawings, there may be seen a modified form of spring seat referred to in general by the reference numeral 154. The spring seat 154 includes a generally U-shaped body 156 which is inverted and includes a pair of opposite side plates 158 interconnected at their upper ends by means of a bight portion 160. The lower ends of the plates 158 have downwardly opening recesses 162 formed therein whereby the plates 158 may snugly embracingly receive the corresponding axle member 18 and the marginal edge portions of the plates 158 defining the recesses 162 are welded to the axle 18.

The lower end portions of the plates 158 are interconnected by means of slightly downwardly convergent end plates 164 secured therebetween by welding and the lower ends of the end plates 164 are turned inwardly as at 166 and welded to the corresponding axle member 18. In addition, the spring seats 154 include horizontal bearing plates 168 secured between the corresponding side plates and to the upper marginal edge portions of the corresponding end plates 164. The bearing plates 168 are centrally apertured as at 170 and each forward end plate 164 includes a forwardly projecting mounting boss 170 having a vertical threaded bore (not shown) secured thereto.

An abutment plate 172 is secured between the rear upper marginal edge portions of each pair of opposite side plates 158 and has a smooth bore 174 formed therethrough. In addition, a static wedge member 176 having a vertical locating opening 178 formed therethrough is provided and disposed over the uppermost leaf of the corresponding spring 30 with the upper end of the fastener 128 received in the opening 178 whereby horizontal shifting of the static wedge member 176 will be limited. A movable wedge member 180 is provided and includes a lower rearwardly and upwardly inclined wedge surface 182 which is compatible with the upper forwardly and downwardly inclined wedge surface 184 of the lower stationary wedge member 176. The movable wedge member 180 has a threaded bore 186 formed therethrough and a bolt 190 has its unthreaded shank portion 192 rotatably received through the bore 174 and its threaded shank portion 194 threadedly engaged in the bore 186. Accordingly, tightening of the bolt 190 will cause rearward movement of the movable wedge member 180 and cause the associated spring 30 to be compressively engaged between the stationary wedge member 176 and the bearing plate 178. Also, it will be noted that the head of the bolt 190 is provided with a diametric bore 196 whereby the bolt 190 may be safety wired.

In FIG. 18 of the drawings there may be seen an anti-hop attachment referred to in general by the reference numeral 198 which is adapted to be utilized in conjunction with the spring seat 154. The anti-hop attachment 198 includes a pair of opposite side blades 200 whose lower end portions have aligned apertures 202 formed therethrough and whose upper end portions are interconnected by means of a plate 204 secured therebetween and centrally apertured as at 206. The forward edge of the plate 204 curves upwardly as at 208 and has a rigid sleeve member 210 secured thereto. When the anti-hop attachment 198 is utilized, a bolt 212 is secured through the plate 204 and threadedly engaged in the mounting boss 170 with the rigid sleeve 210 aligned with the bores (corresponding to apertures 116) formed through the mounting plate portions 214 (corresponding to flanges 114) also supported from the spring seat 154. The rear ends of the torque arms 35 and 36 are secured between the lower portions of the plates 200 by means of fasteners 216 and fasteners 218 are utilized to secure the rigid sleeve portions 210 between the plates 214.

With attention now invited more specifically to FIGS. 19 and 20 of the drawings it may be seen that the lower marginal edge portions of the side plates 158 may have different shaped recesses 220 and 222 formed therein whereby the spring seats 154 may be adapted for securement to axle members 18' and 18" which are rectangular and circular, respectively, in cross-sectional shape. Of course, the spring seats 32 may also be similarly modified for securement to axle members of rectangular and circular cross-section.

With reference now more specifically to FIG. 21 of the drawings it may be seen that a control arm 226 may be secured between the innermost plate or flange 214 and the innermost plate 42 by means of fasteners 228 and 230. The control arm 226 is of course to be secured between a corresponding equalizer beam mounting bracket 26 and the corresponding rear spring seat 154 with the control rod 126 paralleling the corresponding torque arm 36. When the control rod 226 is to be utilized, the spring seat 154 is modified by the attachment of a mounting plate 232, see FIG. 23, thereto in order that the fastener 228 may secure the rear end of the control rod 226 to the corresponding rear spring seat 154.

Figure 22:
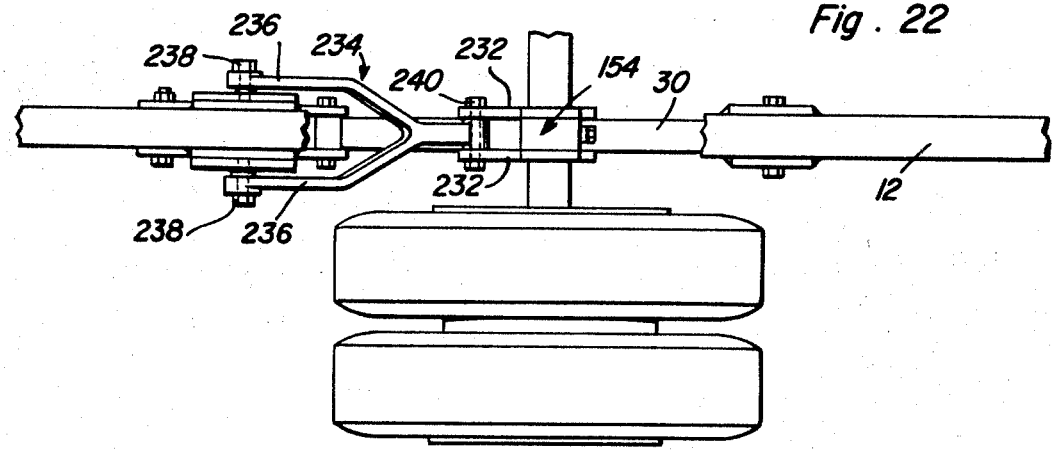
FIG. 22 is a fragmentary top plan view similar to FIG. 21 but illustrating a second form of control rod being utilized.
Figure 23:
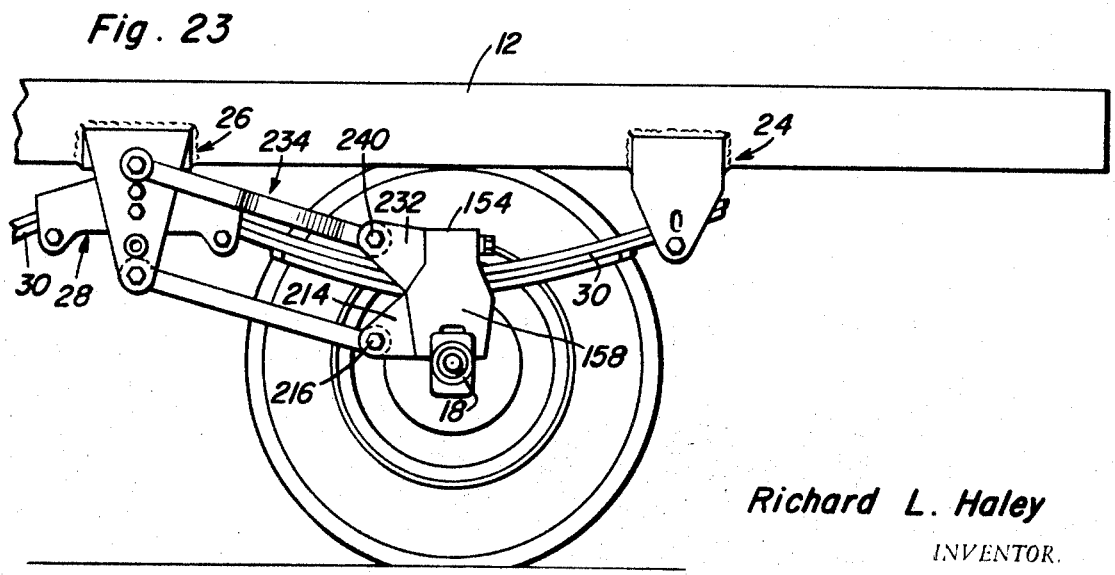
FIG. 23 is a side elevational view of the structure illustrated in FIG. 22.

With attention now invited more specifically to FIGS. 22 and 23 of the drawings, there will be seen a modified form of control arm referred to in general by the reference numeral 234 and which is Y-shaped in configuration. The free ends of the arms 236 of the Y-shaped control arm 234 are secured to the opposite side plates 42 of the corresponding equalizer beam mounting bracket 26 by means of fasteners 238 and the corresponding rear spring seat 154 has a pair of mounting flanges or plates 132 secured thereto between which the adjacent end of the control arm or rod 234 is secured by means of a fastener 240.

In review, it will be noted that the various components of the suspension assembly may be prefabricated (some by casting or fabrication) and readily assembled with a minimum amount of effort. The various hanger brackets 22 and 24, the spring 30, the torque arms 35 and 36, the equalizer beam mounting bracket 26 and equalizer beam 28 and also the spring seats 32 and anti-hop attachments 34 may be readily shipped in preassembled form to a point of assembly. Further, the spring seats 32 and 154 are constructed such that the U-bolts 132 and bolts 190 are readily accessible for periodic torquing. Also, the anti-hop attachments 34 and 198 are readily attachable to existing spring seats 32 and 154 and the control arms 226 and 234 are also readily attachable to existing spring seats 154 and equalizer beam mounting brackets 26.

The spring bearing pads 58 and bearing pad supports 70 operate to maintain substantially constant distances therebetween during flexure of the springs 30 and the shifting of the opposite ends of the springs 30 relative to the pads 58 and 70 is divided at the opposite ends of the springs 30 so as to equally divide wear on the springs 30 and the various spring pad seats. Also, inasmuch as the U-bolts 132 are upwardly convergent, only extremely short mid-portions of the springs 30 are maintained against flexure.

Inasmuch as the torque arms 35 and 36 are removably supported at their rear ends, they may be readily disengaged from the anti-hop attachments 34 and 198 and secured directly to the spring seats 32 and 154, if desired. Also, the spring seats 154 are operative to readily compensate for spring mid-portions of different heights and each is provided with an abutment fastener 250 which functions to removably retain the corresponding sliding wedge member 180 within the confines of the plates 158.

Inasmuch as the elongated member 48, the sleeve 62 and the sleeve 64 are generally egg-shaped in cross-sectional shape, any tendency of the equalizer beam 28 to oscillate relative to the equalizer beam mounting bracket 26 is resisted by compression of predetermined portions of the sleeve 64 and the sleeve 64 is not placed under shearing stresses during oscillation of the equalizer beam 28. Also, it will be noted that the larger end of the egg-shaped elongated member 48 is disposed lowermost whereby heavy loading of the vehicle frame 10 is absorbed at the larger end of the elongated member 48.

Only the upper two leaves 118 and 120 of each spring 130 are full length leaves and the adjacent ends of corresponding leaves 120 are turned downwardly as at 250 for abutment with the fasteners 60 in the event the axle members 18 drop excessively away from the longitudinal frame members 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an elongated transverse axle member, a spring seat for anchoring the midportion of a leaf spring to the corresponding end of said axle member, said spring seat including a down-wardly opening housing provided with opposite side walls and opposite end walls interconnected at their upper end portions by means of a horizontal wall secured therebetween, the lower portions of said side walls having downwardly opening recesses formed in their lower marginal portions embracing and seatingly receiving approximately the upper half portions of longitudinally spaced zones of said axle member therein with said upper portions also snugly received between the lower marginal portions of said end walls, the upper surface of said horizontal wall being contoured so as to be adapted to have the undersurface of the midportion of a leaf spring tightly clamped thereagainst, the lower marginal edges of said end walls and the edges of said side walls defining said recesses being smoothly contoured and fully welded to the opposing surfaces of said axle member, said seat further including clamp means for clamping said leaf spring against the upper surface of said horizontal wall, independent of said axle member.

2. The combination of claim 1 wherein one of said end walls includes a pair of outwardly projecting gusset plates secured thereto, and a mounting strap secured beneath the undersurfaces of each pair of gusset plates and the under edge portion of the corresponding end wall.

3. The combination of claim 2 wherein the opposite ends of said mounting straps project beyond said side plates and having upstanding U-bolt leg receiving bores formed therethrough.

4. The combination of claim 3 wherein said bores in said mounting straps are upwardly convergent, said clamp means including a pair of upwardly convergent inverted U-bolts whose legs project downwardly through said bores and whose upper ends are closely spaced apart.

5. The combination of claim 1 wherein one of said end walls includes a pair of outwardly projecting gusset plates secured thereto, the outer lower corners of gusset plates being provided with aligned apertures for securing one end of an associated control arm therebetween.

6. The combination of claim 1 wherein said side walls project above said horizontal wall, a top wall secured between the upper ends of said side walls, said top wall including a depending abutment, said generally horizontal wall being spaced below said top wall and adapted to have the under surface of the midportion of a leaf spring assembly disposed beneath said top wall rest thereon, said clamp means including a first wedge member disposed between said side walls below said top wall and above said horizontal wall and adapted to be stationarily supported relative to the upper surface of the midportion of said leaf spring assembly, said first wedge member including inclined upper surface and a second upper wedge member disposed beneath said top wall and slidable therealong, said second wedge member including an inclined under surface compatible with the inclined surface of the lower wedge member and means operatively connected between said first wedge member and said abutment for shifting the first wedge member toward and away from said abutment.

7. The combination of claim 6 wherein the last-mentioned means comprises a bolt rotatably and slidably received through a bore formed through said abutment and threadedly engaged with said first wedge member.

8. In combination with an elongated transverse axle member, a spring seat for anchoring the midportion of a leaf spring to the corresponding end of said axle member, said spring seat including a downwardly opening housing provided with opposite side walls and opposite end walls interconnected at their upper end portions by means of a horizontal wall secured therebetween, the lower portions of said side walls having downwardly opening recesses formed in their lower marginal portions embracing and seatingly receiving approximately the upper half portions of longitudinally spaced zones of said axle member therein with said upper portions also snugly received between the lower marginal portions of said end walls, a pair of laterally spaced mounting ears projecting outwardly from opposite ends of one of said end walls, an anti-hop attachment including a pair of spaced upstanding flanges having pairs of registered upper and lower apertures formed therein, the upper ends of said flanges being secured to said ears and adapted to have one end of a torque arm pivotally secured there-between and the lower ends of said flanges being adapted to have one end of a control arm pivotally secured therebetween, a brace extending and secured between the lower ends of said flanges and secured to said spring seat adjacent the lower marginal edge of said one end wall.

9. The combination of claim 1 wherein one of said end walls includes a pair of outwardly projecting gusset plates secured thereto, the outer lower corners of gusset plates being provided with aligned apertures for securing one end of an asso-ciated control arm therebetween, wherein said spring seat includes a second pair of apertured gusset plates disposed above the first pair of gusset plates and adapted to have one end of a second control arm pivotally secured therebetween.

* * * * *